US012812001B2

(12) United States Patent
Pippari et al.

(10) Patent No.: US 12,812,001 B2
(45) Date of Patent: Nov. 24, 2026

(54) LAYERED SHARDING

(71) Applicant: Microsoft Technology Licensing, LLC, Redmond, WA (US)

(72) Inventors: Suresh Chandra Pippari, Bothell, WA (US); Abhishek K. Tiwari, Woodinville, WA (US); Varun Chawla, Sammamish, WA (US); Karthik Uthaman, Seattle, WA (US); Ashok Kumar Nandoori, Frisco, TX (US); Matthew David Devuyst, Carlsbad, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 19/059,230

(22) Filed: Feb. 20, 2025

(65) Prior Publication Data

US 2026/0246831 A1 Aug. 20, 2026

(51) Int. Cl.
*H04L 67/1014* (2022.01)
*H04L 67/1031* (2022.01)

(52) U.S. Cl.
CPC ...... *H04L 67/1014* (2013.01); *H04L 67/1031* (2013.01)

(58) Field of Classification Search
CPC ........................ H04L 67/1014; H04L 67/1031
See application file for complete search history.

(56) References Cited

U.S. PATENT DOCUMENTS

| | | | |
|---|---|---|---|
| 8,706,885 | B2 | 4/2014 | Degaonkar |
| 9,906,589 | B2 | 2/2018 | Kathuria |
| 10,061,668 | B1 | 8/2018 | Lazier |
| 10,437,506 | B2 | 10/2019 | Koppolu |
| 10,509,909 | B2 | 12/2019 | Andriani |
| 10,678,664 | B1 | 6/2020 | Lazier |
| 10,893,123 | B2 | 1/2021 | Chen |
| 10,977,128 | B1 | 4/2021 | Lazier |
| 11,102,139 | B1 | 8/2021 | Deng |

(Continued)

OTHER PUBLICATIONS

International Search Report and Written Opinion received for PCT Application No. PCT/US2025/058485 mailed on Date Mar. 24, 2026, 16 Pages.

(Continued)

*Primary Examiner* — Brian Whipple
(74) *Attorney, Agent, or Firm* — Foley IP Law, PLLC

(57) ABSTRACT

Disclosed layered sharding for multi-tenant services outperforms current sharding techniques, to enhance the reliability and scalability of services. A sharding controller assigns clients and service instances to shards in each of multiple layers. Each layer can handle requests for any client, with assignments differing among the layers, at least for clients and may also for service instances. This minimize adverse effects on clients assigned to a shard with a noisy neighbor, because there are other layers (with a high probability) in which they are not sharing a shard with that noisy neighbor. As an example, with 40 service instances with 4 per shard, and shuffle sharding assignment with ${}^{40}C_4$=91390 shards, the likelihood of a client sharing a shard with the same noisy neighbor in all layers is $O(10^{-8})$ for two layers, dropping rapidly to $O(10^{-17})$ for four layers.

20 Claims, 11 Drawing Sheets

(56) References Cited

U.S. PATENT DOCUMENTS

| | | | | |
|---|---|---|---|---|
| 11,113,161 | B2 | 9/2021 | Lazier | |
| 11,148,923 | B2 | 10/2021 | Ziegler | |
| 11,738,983 | B2 | 8/2023 | Clüsserath | |
| 11,947,555 | B1 | 4/2024 | Mohideen | |
| 11,954,541 | B1 | 4/2024 | Carl | |
| 12,401,675 | B2 | 8/2025 | Andriani | |
| 12,619,633 | B2 | 5/2026 | Whitaker | |
| 2014/0032750 | A1 | 1/2014 | Degaonkar | |
| 2016/0142475 | A1 | 5/2016 | Kathuria et al. | |
| 2017/0264483 | A1* | 9/2017 | Lambeth | G06F 9/45558 |
| 2017/0264489 | A1* | 9/2017 | Lambeth | H04L 41/06 |
| 2020/0099614 | A1 | 3/2020 | Vutharkar | |
| 2024/0022629 | A1* | 1/2024 | Wang | H04L 41/0894 |
| 2024/0394253 | A1 | 11/2024 | Neubeck | |
| 2024/0427804 | A1 | 12/2024 | Schwerin | |
| 2025/0279923 | A1 | 9/2025 | Chandran | |
| 2026/0154254 | A1 | 6/2026 | Brooker | |
| 2026/0154287 | A1 | 6/2026 | Brooker | |
| 2026/0246828 | A1 | 8/2026 | Pippari | |
| 2026/0246829 | A1 | 8/2026 | Pippari | |

OTHER PUBLICATIONS

Lee, et al., "Shard Manager: A Generic Shard Management Framework for Geo-distributed Applications", Proceedings of the ACM SIGOPS 28th Symposium on Operating Systems Principles, Oct. 26, 2021, pp. 533-569.

Non-Final office Action mailed on Jun. 25, 2026, in U.S. Appl. No. 19/059,220, 05 pages.

Non-Final Office Action, U.S. Appl. No. 19/059,232, mailed Sep. 8, 2026, 09 Pages.

Notice of Allowance mailed on Oct. 13, 2026, in U.S. Appl. No. 19/059,220, 10 pages.

* cited by examiner

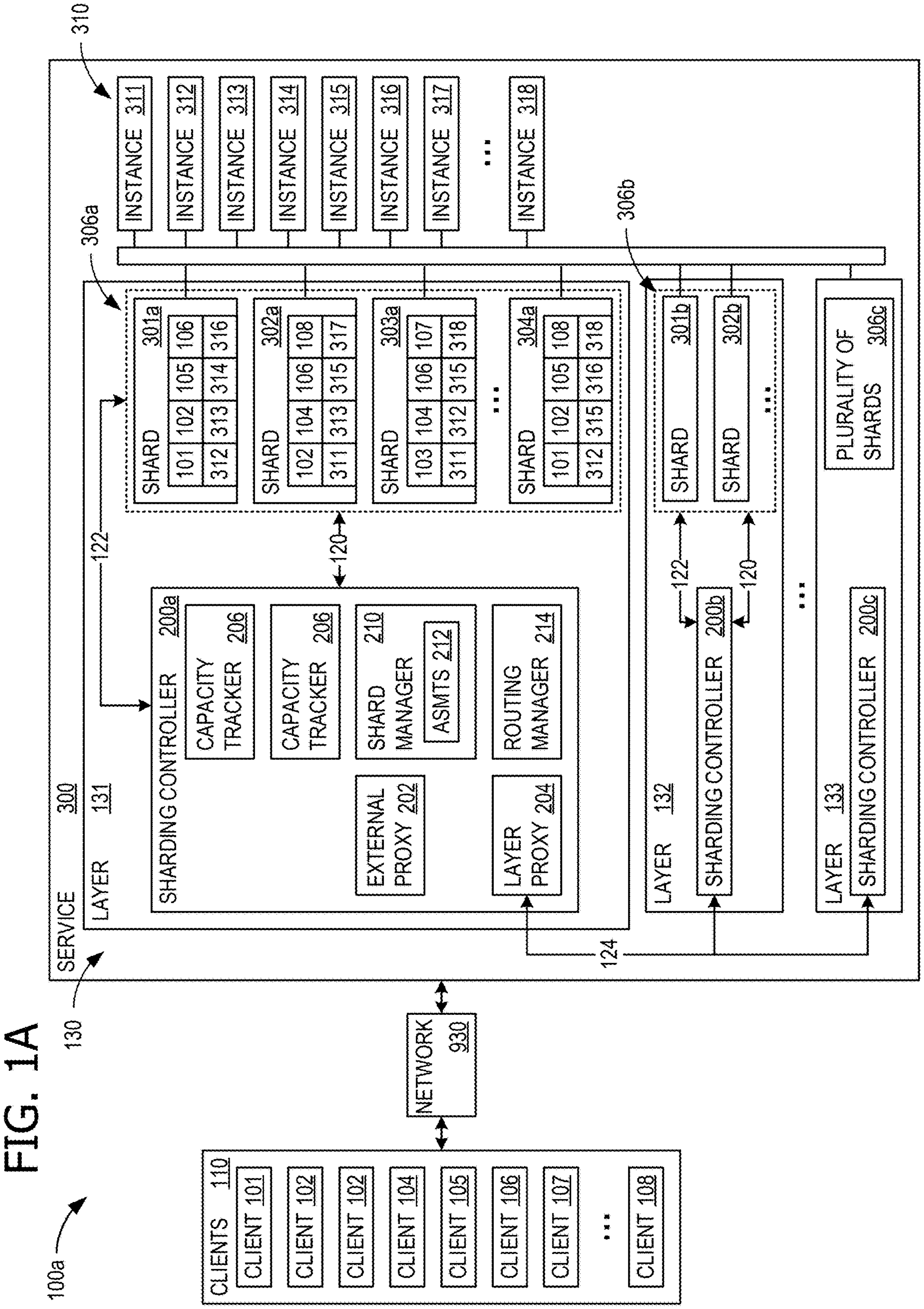
FIG. 1A
100a
130
SERVICE 300
310
INSTANCE 311
INSTANCE 312
INSTANCE 313
INSTANCE 314
INSTANCE 315
INSTANCE 316
INSTANCE 317
INSTANCE 318
306a
306b
LAYER 131
SHARDING CONTROLLER 200a
CAPACITY TRACKER 206
CAPACITY TRACKER 206
SHARD MANAGER 210
ASMTS 212
ROUTING MANAGER 214
EXTERNAL PROXY 202
LAYER PROXY 204
SHARD 301a
101 102 105 106
312 313 314 316
SHARD 302a
102 104 106 108
311 313 315 317
SHARD 303a
103 104 106 107
311 312 315 318
SHARD 304a
101 102 105 108
312 315 316 318
120
122
LAYER 132
SHARDING CONTROLLER 200b
SHARD 301b
SHARD 302b
LAYER 133
SHARDING CONTROLLER 200c
PLURALITY OF SHARDS 306c
124
NETWORK 930
CLIENTS 110
CLIENT 101
CLIENT 102
CLIENT 102
CLIENT 104
CLIENT 105
CLIENT 106
CLIENT 107
CLIENT 108

LAYERED SHARDING

BACKGROUND

Multi-tenant services often face challenges concerning fault isolation and load distribution. Harmful requests from a single tenant may cause service instances to crash, degrade, or drop traffic, which spreads the impact to other tenants. Sharding is a fault isolation approach that is often used to address this issue. Sharding partitions a service and its data into multiple segments identified as "shards" that each serves a subset of clients and processes a portion of the service's transactions independently. As used herein, a tenant may represent an organizational customer (e.g., tenant and customer are synonymous herein), whereas a client may represent an individual user within a tenant. That is, a single tenant may have one or more clients.

This approach can isolate faults to a single shard, but the impact on other clients within the affected shard may be significant. Further, existing sharding techniques may still experience uneven load distribution and localized hotspots due to noisy neighbors, which allows for cross-tenant impacts, compromising overall performance.

SUMMARY

The disclosed examples are described in detail below with reference to the accompanying drawing figures listed below. The following summary is provided to illustrate some examples disclosed herein.

Solutions disclosed herein provide layered ingress sharding for multi-tenant services, which improve performance relative to existing sharding techniques such as traditional sharding with partitioning or shuffle sharding. Examples assign, by a sharding controller, within each layer of a plurality of layers, two or more service instances of a plurality of service instances to each shard of a plurality of shards, wherein each layer of the plurality of layers has a separate plurality of shards; assign, within each layer, each client of a plurality of clients to one or more shards of the plurality of shards within that layer, wherein assignments of clients to shards differs for each separate plurality of shards across the plurality of layers; monitor a health of each service instance within each shard of the pluralities of shards; based on at least the monitoring of the service instances, identify healthy shards of the pluralities of shards; receive a first request from a first client of the plurality of clients; and route the first request to a first healthy shard assigned to the first client.

Additional solutions disclosed herein provide ingress sharding for multi-tenant services, which improve performance relative to existing sharding techniques such as traditional sharding with partitioning or shuffle sharding. Examples monitor, by a sharding controller, a health of each service instance within each shard of a plurality of shards, wherein each shard comprises two service instances of a plurality of service instances; based on at least the monitoring, identify healthy service instances of the plurality of service instances, wherein a service instance is healthy if the service instance meets responsiveness criteria, and wherein a service instance is not healthy if the service instance is not able to meet the responsiveness criteria; based on at least the identification of healthy service instances, identify healthy shards of the plurality of shards, wherein a shard is healthy if the shard has at least one healthy service instance, and wherein a shard is not healthy if the shard does not have at least one healthy service instance; receive a first request from a first client of a plurality of clients; and based on at least the identification of the healthy shards, route the first request to a first healthy shard assigned to the first client.

Additional Solutions disclosed herein provide layered sharding for multi-tenant services, which improve performance relative to existing sharding techniques such as traditional sharding with partitioning or shuffle sharding. Examples assign, by a sharding controller, within each layer of a plurality of layers, two or more service instances of a plurality of service instances to each shard of a plurality of shards, wherein each layer of the plurality of layers has a separate plurality of shards; assign, within each layer, each client of a plurality of clients to two or more shards of the plurality of shards within that layer, wherein assignments of clients to shards differs for each separate plurality of shards across the plurality of layers; receive a first request from a first client of the plurality of clients; based on at least receiving the first request, identify shards assigned to the first client; and based on at least the identification of the shards assigned to the first client, route the first request to a shard assigned to the first client.

BRIEF DESCRIPTION OF THE DRAWINGS

The disclosed examples are described in detail below with reference to the accompanying drawing figures listed below:

FIG. 1A illustrates an alternative example architecture that may be used in place of the architecture of FIG. 1;

Corresponding reference characters indicate corresponding parts throughout the drawings.

DETAILED DESCRIPTION

Figure 1:
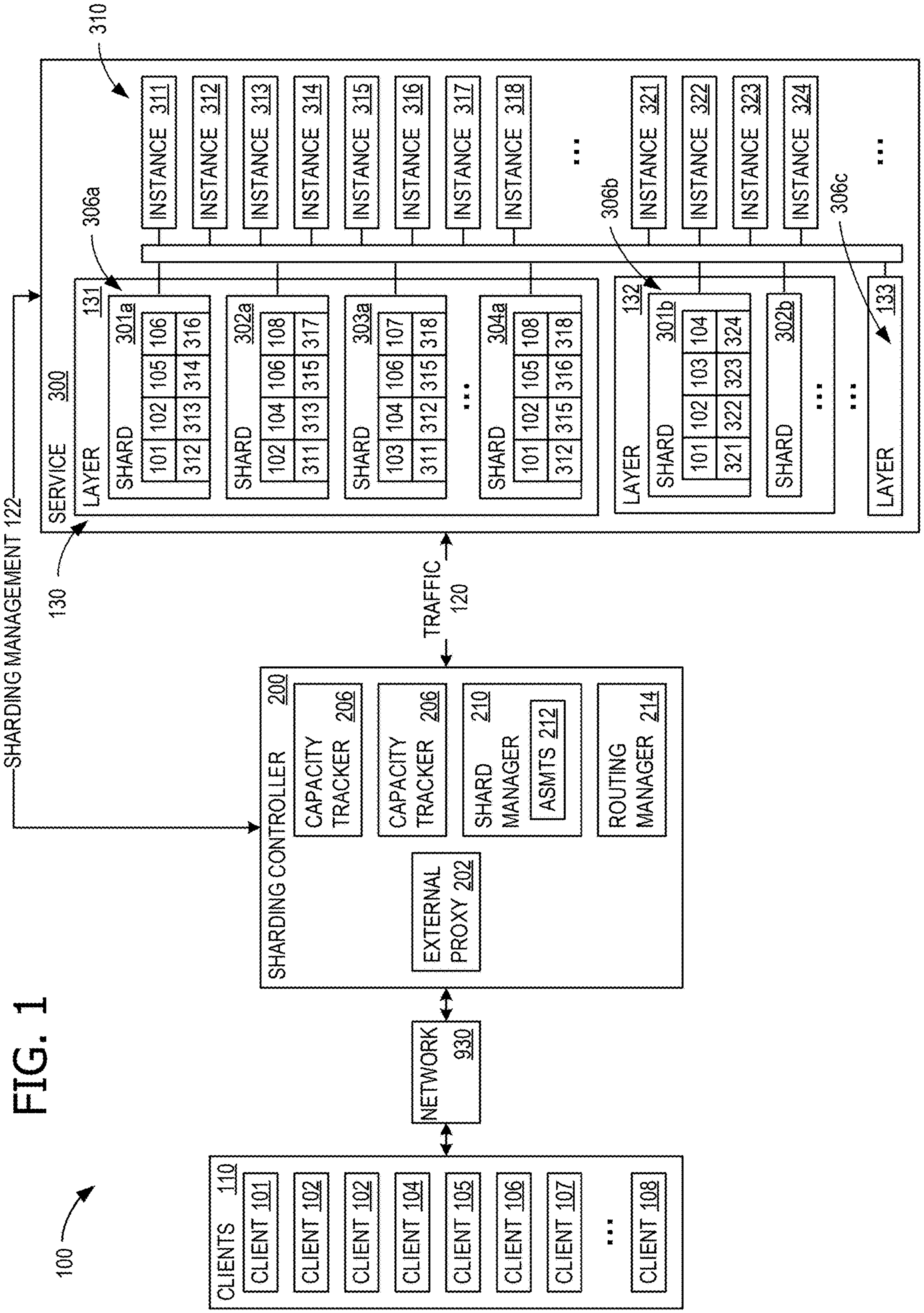
FIG. 1 illustrates an example architecture that advantageously provides layered ingress sharding for multi-tenant services, and which has improved performance relative to existing sharding techniques.

Multiple novel concepts are introduced herein, including ingress sharding and layered sharding, each of which may be practiced independently or together as layered ingress sharding.

The disclosed ingress sharding for multi-tenant services outperforms current sharding techniques, to enhance the reliability and scalability of services. A sharding controller efficiently routes client requests across shards/partitions to improve fault isolation, reduce impact across clients, and distribute loads more evenly. Faults may be isolated within individual shards, and hotspots are reduced to enhance overall system performance. Some examples provide enhanced routing guidance for client requests to reduce reliance on client retry behavior. The sharding controller monitors service instance health and available capacity, which indicates shard health and capacity. Client requests are routed to healthy shards, where retries will eventually find a healthy service instance or, in some examples, requests are routed directly to healthy service instances, eliminating the need for a retry. The underlying sharding arrangement is leveraged to provide well-behaved clients a path to a healthy service instance, whereas the noisy client remains isolated in the affected shard(s).

Aspects of the disclosure solve multiple problems that are necessarily rooted in computer technology, and render use of computing platforms more efficient in common sharding use cases, by providing the practical result of improved fault isolation. For example, well-behaved clients are provided a path to a healthy service instance, away from shards negatively impacted by a noisy client. This significantly improves the use of computers for networked operations. These advantageous results are accomplished, at least in part, by routing a client request to a healthy shard assigned to the client, based on at least identification of healthy shards.

Disclosed layered sharding for multi-tenant services outperforms current sharding techniques, to enhance the reliability and scalability of services. A sharding controller assigns clients and service instances to shards in each of multiple layers. Each layer can handle requests for any client, with assignments differing among the layers, at least for clients and may also for service instances. This minimize adverse effects on clients assigned to a shard with a noisy neighbor, because there are other layers (with a high probability) in which they are not sharing a shard with that noisy neighbor. As an example, with 40 service instances with 4 per shard, and shuffle sharding assignment with $^{40}C_4$=91390 shards, the likelihood of a client sharing a shard with the same noisy neighbor in all layers is $O(10^{-8})$ for two layers, dropping rapidly to $O(10^{-17})$ for four layers.

Aspects of the disclosure solve multiple problems that are necessarily rooted in computer technology, and render use of computing platforms more efficient in common sharding use cases, by providing the practical result of improved fault isolation. For example, well-behaved clients are provided a path to a healthy service instance, rather than remaining in a shard that is negatively impacted by a noisy client. This significantly improves the use of computers for networked operations. These advantageous results are accomplished, at least in part, by assigning, by a sharding controller, within each layer of a plurality of layers, two or more service instances of a plurality of service instances to each shard of a plurality of shards, wherein each layer of the plurality of layers has a separate plurality of shards . . . and assigning, within each layer, each client of a plurality of clients to two or more shards of the plurality of shards within that layer, wherein assignments of clients to shards differs for each separate plurality of shards across the plurality of layers, wherein assignments of service instances to shards differs for each separate plurality of shards across the plurality of layers.

Disclosed layered ingress sharding for multi-tenant services outperforms current sharding techniques, to enhance the reliability and scalability of services. A sharding controller assigns clients and service instances to shards in each of multiple layers. Each layer can handle requests for any client, with assignments differing among the layers, at least for clients and may also for service instances. This minimizes adverse effects on clients assigned to a shard with a noisy neighbor, because there are other layers (with a high probability) in which they are not sharing a shard with that noisy neighbor. As an example, with 40 service instances with 4 per shard, and shuffle sharding assignment with $^{40}C_4$=91390 shards, the likelihood of a client sharing a shard with the same noisy neighbor in all layers is $O(10^{-8})$ for two layers, dropping rapidly to $O(10^{-17})$ for four layers and $O(10^{-100})$ for 20 layers. This is on top of redirecting client requests to healthy shards or service instances.

The sharding controller also monitors service instance health and available capacity, which indicates shard health and capacity. Client requests are efficiently routed to healthy shards across shards/partitions and layers to improve fault isolation, reduce impacts across clients, and distribute loads more evenly. Faults may be isolated within individual shards, and hotspots are reduced to enhance overall system performance. Retries will eventually find a healthy service instance within a healthy shard or, in some examples, requests are routed directly to healthy service instances, eliminating the need for a retry Sharding is complementary to other forms of partitioning, such as vertical partitioning and functional partitioning. The disclosed layered ingress sharding combines the benefits of layered sharding and ingress sharding to achieve single-tenant fault isolation and efficient load distribution. That is, single-tenant isolation is achieved using both layering and ingress redirection (based on health and capacity monitoring). The noisy neighbor effect is significantly reduced compared with existing sharding techniques because the traffic is redirected to other layers and/or shards where the same noisy neighbor is not present. The inventive sharding controller may be offered as a service to independently-operated multi-tenant services.

Aspects of the disclosure solve multiple problems that are necessarily rooted in computer technology, and render use of computing platforms more efficient in common sharding use cases, by providing the practical result of improved fault isolation. For example, well-behaved clients are provided a path to a healthy service instance, rather than remaining in a shard that is negatively impacted by a noisy client. This significantly improves the use of computers for networked operations. These advantageous results are accomplished, at least in part, by assigning, by a sharding controller, within each layer of a plurality of layers, two or more service instances of a plurality of service instances to each shard of a plurality of shards; and routing a first request to a first healthy shard assigned to a first client.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 advantageously provides layered ingress sharding for multi-tenant services, and which has improved performance relative to existing sharding techniques. In architecture 100, a multi-tenant service 300 has a plurality of service instances 310, comprising service instances 311-318 and 321-324, that is partitioned (sharded) into shards across multiple layers. A plurality of layers 130, within service 300, has a layer 131, a layer 132, and a layer 133. Layer 131 has a shard 301*a*, a shard 302*a*, a shard 303*a*, and a shard 304*a*. Layer 132 and layer 133 each have shards, although for clarity of presentation only a shard 301*b* and a shard 302*b* are shown. Some examples may use a different number of service instances, a different number of shards, a different number of layers, and/or a different number of shards per layer. For ingress sharding, layering is not used, and the available service instances are within what is shown as and described as layer 131.

Each of layers 131-133 has a set of service instances of the plurality of service instances 310 as a plurality of shards. Layer 131 has a plurality of shards 306*a*, layer 132 has a plurality of shards 306*b*, and layer 133 has a plurality of shards 306*c*. In some examples, each layer has its own set of service instances. In some examples, specific service instances may be shared across layers, but the assignment scheme of service instances to shards differs (i.e., the assignments of service instances to shards differs for each separate plurality of shards 306*a*-306*c* across plurality of layers 130). This prevents, for examples the set of service instances in shard 301*b* (of layer 132) duplicating the set of service instances in any of shards 301*a*-304*a* of layer 131. This is also the case for shard 301*b* of layer 132, and for each shard of layer 133. Some examples use shuffle sharding for shard assignments, although traditional sharding may also be used.

In the illustrated example, each shard has four service instances, although some examples may use a different number of service instances per shard. The use of four service instances per shard is based on clients typically being configured for three retries (in the event that a service instance is non-responsive). As illustrated, shard 301*a* has service instance 312, service instance 313, service instance 314, and service instance 316. Shard 302*a* has service instance 311, service instance 313, service instance 315, and service instance 317. Shard 303*a* has service instance 311, service instance 312, service instance 315, and service instance 318. Shard 304*a* has service instance 312, service instance 315, service instance 316, and service instance 316. Shard 301*b* has service instance 321, service instance 322, service instance 323, and service instance 324.

A shard manager 210, in sharding controller 200, assigns service instances 311-318 and 321-324 to the shards, and tracks those assignments in service instance shard assignments 212, which provides a sharding to tenant mapping. In some examples, shuffle sharding is used to assign service instances to shards, and in some examples, each service instance is assigned to two or more shards, simultaneously. In some examples, each shard has two or more service instances, with four being a common count of service instances per shard, based on clients 101-108 commonly being configured for three retries.

In some examples, if the number of service instances is M and the number of service instances assigned to each shard is N, the number of shards in each layer is given by:

$$^{M}C_{N}(M \text{ choose } N) \quad \text{Eq. (1)}$$

For example, if M=40 and N=4, then the number of shards in each layer is:

$$^{40}C_{4} = 91390 \quad \text{Eq. (2)}$$

Shard manager 210 also assigns clients 101-108 to the shards and tracks the sharding to tenant mappings (i.e., the client to shard assignments) in shard assignments 212. In some examples, assignments of clients to shards is random, and in some examples, each client within plurality of clients 110 is assigned to more than just a single shard (i.e., two or more shards) per layer, simultaneously. In some examples, clients within a common tenant may be assigned to a common shard or set of shards, and the tenant assignment is what is random. In the examples described herein, client 101 is assigned to shard 301*a*, shard 304*a*, and shard 301*b*. Client 102 is assigned to shard 301*a*, shard 302*a*, shard 304*a*, and shard 301*b*. Client 103 is assigned to shard 303*a*, and shard 301*b*. Client 104 is assigned to shard 302*a*, shard 303*a*, and shard 301*b*. Client 105 is assigned to shard 301*a* and shard 304*a*. Client 106 is assigned to shard 301*a*, shard 302*a*, and shard 304*a*. Client 108 is assigned to shard 302*a*. Client 108 is assigned to shard 302*a* and shard 304*a*. In some examples, each client may be assigned to only a single shard per layer.

It is worth noting that client 103 is assigned to shard 303*a* with client 107 in layer 131, although in layer 132, client 103 is assigned to shard 301*b* that does not have client 107. The significance of this assignment scenario is described later, in relation to FIG. 3.

Clients of a plurality of clients 110, which includes clients 101-108, reach service 300 over a computer network 930. Requests from clients 101-108 are sent to a sharding controller 200 that manages assignments of service instances 311-318 and 321-324 and clients 101-108 to the various shards across layers 131-133, as well as routes client requests. Client traffic is managed by an external proxy 202 of sharding controller 200, and is passed between sharding controller 200 and service 300 as traffic 120. In some examples, sharding controller 200 is offered as a service by a different entity than the entity that offers multi-tenant services, such as service 300. In such examples, sharding controller 200 stores the internet protocol (IP) address for service 300, such as the IP addresses of shards and/or service instances within a routing manager.

Figure 2:
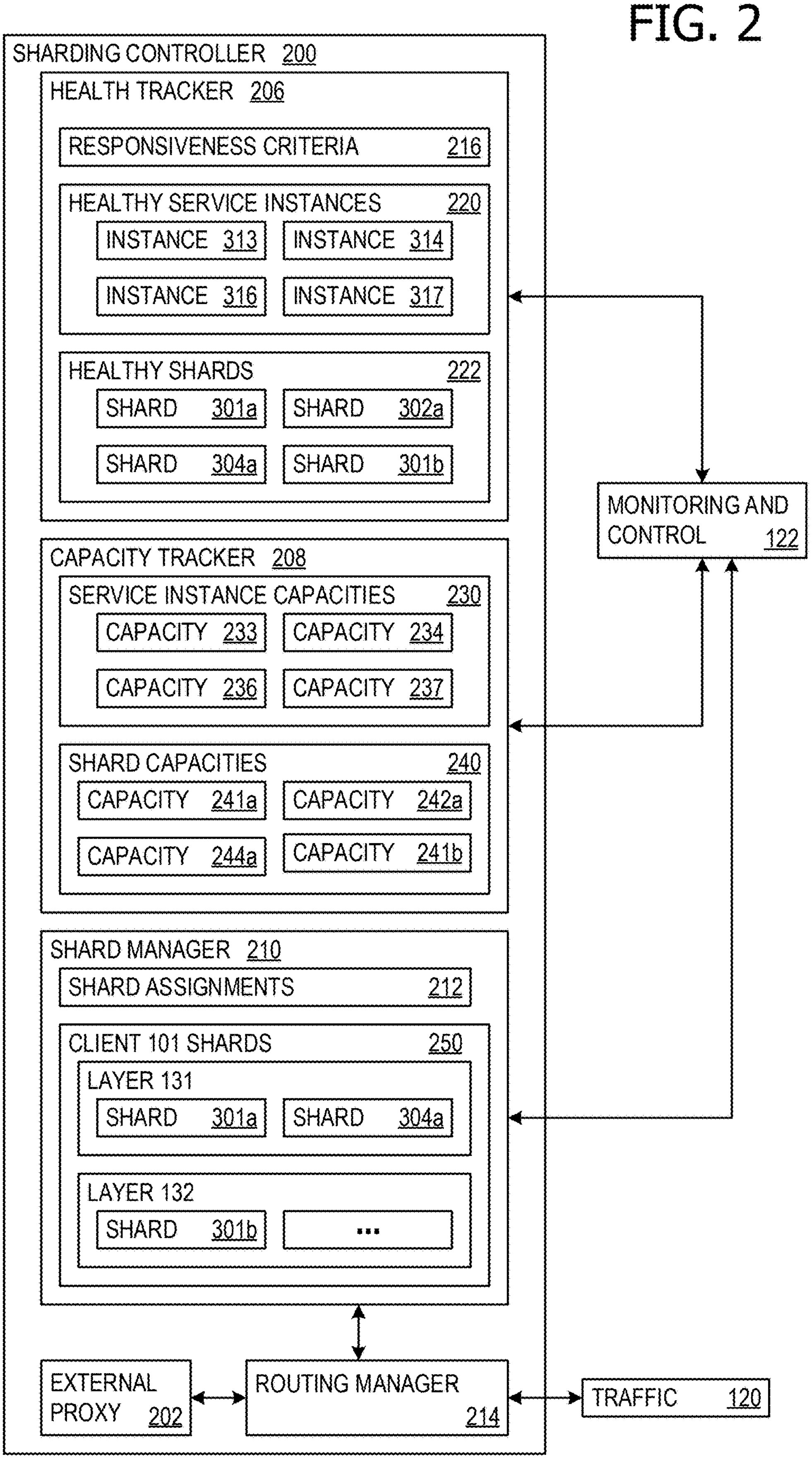
FIG. 2 illustrates further detail for a sharding controller, as may be used in examples of the architecture of FIG. 1.
Figure 3:
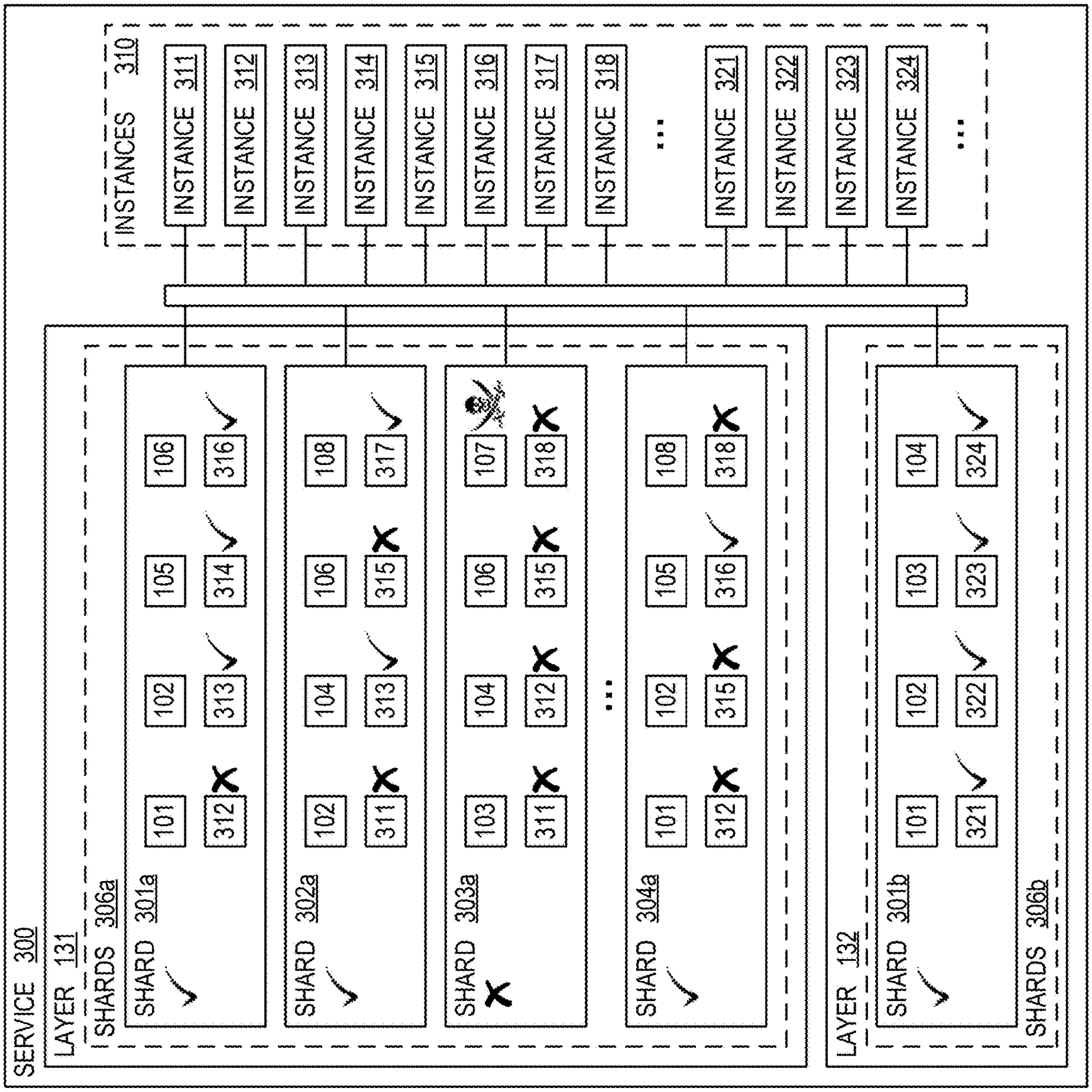
FIG. 3 illustrates further detail for a multi-tenant service with multiple shards, as may be used in examples of the architecture of FIG. 1.
Figure 9:
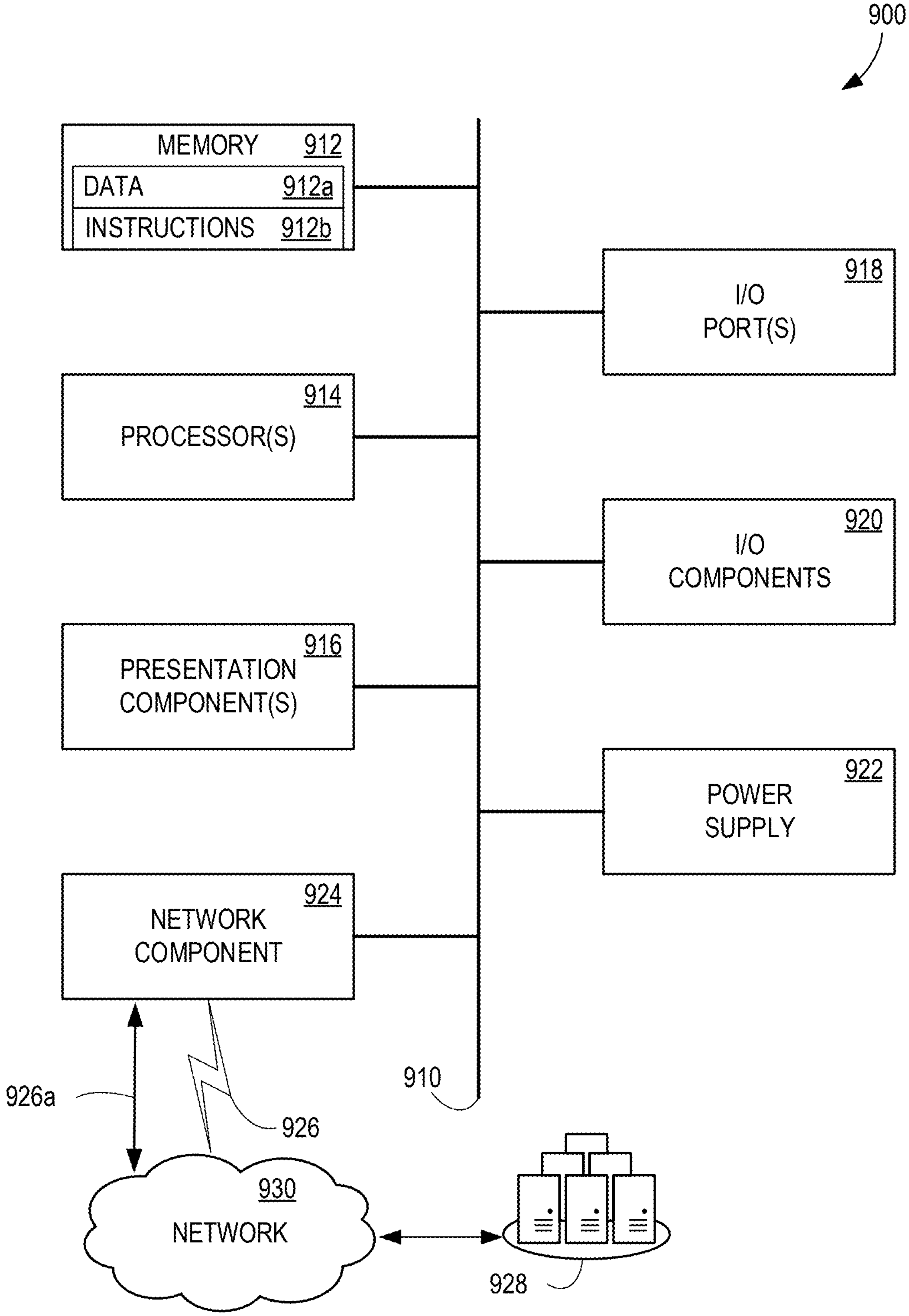
FIG. 9 shows a block diagram of an example computing device suitable for implementing some of the various examples disclosed herein.

Sharding controller 200 is shown in further detail in FIG. 2, and service 300 is shown in further detail in FIG. 3. Sharding controller 200 and service 300 may each use a computing device 900, which is shown in FIG. 9. Computer network 930 is described in further detail in relation to FIG. 9. The operation of architecture 100 is described in further detail below, including in relation to FIGS. 5-7.

In architecture 100 of FIG. 1, a single sharding controller 200 is used as a common controller for all shards and clients across all layers of plurality of layers 130, using sharding management and control signals 122. An alternative example architecture 100*a* is shown in FIG. 1A, in which the sharding control function is handled within each layer's own sharding controller. For example, layer 131 has a sharding controller 200*a*, layer 132 has a sharding controller 200*b*, and layer 133 has a sharding controller 200*c*. FIG. 1A is not relevant to ingress sharding without layering.

This arrangement of architecture 100*a* necessitates communication between a single ingress point for client requests and the different layers. As shown, sharding controller 200*a* has a layer proxy 204 that interfaces with the external proxy 202 (or another layer proxy 204) within the other layers 132 and 133 to route inter-layer traffic 124. For example, a client request may arrive at external proxy 202 in sharding controller 200*a* from a client, but destined for a shard in a different layer. This client request will be forwarded by layer proxy 204 to the sharding controller 200*b* or 200*c* in the appropriate layer 132 or 133. The remaining functionality of described herein for sharding controller 200 (i.e., excluding the inter-layer forwarding of layer proxy 204 in sharding controller 200*a*) may also be present within each of sharding controllers 200*a*-200*c*.

Figure 4:
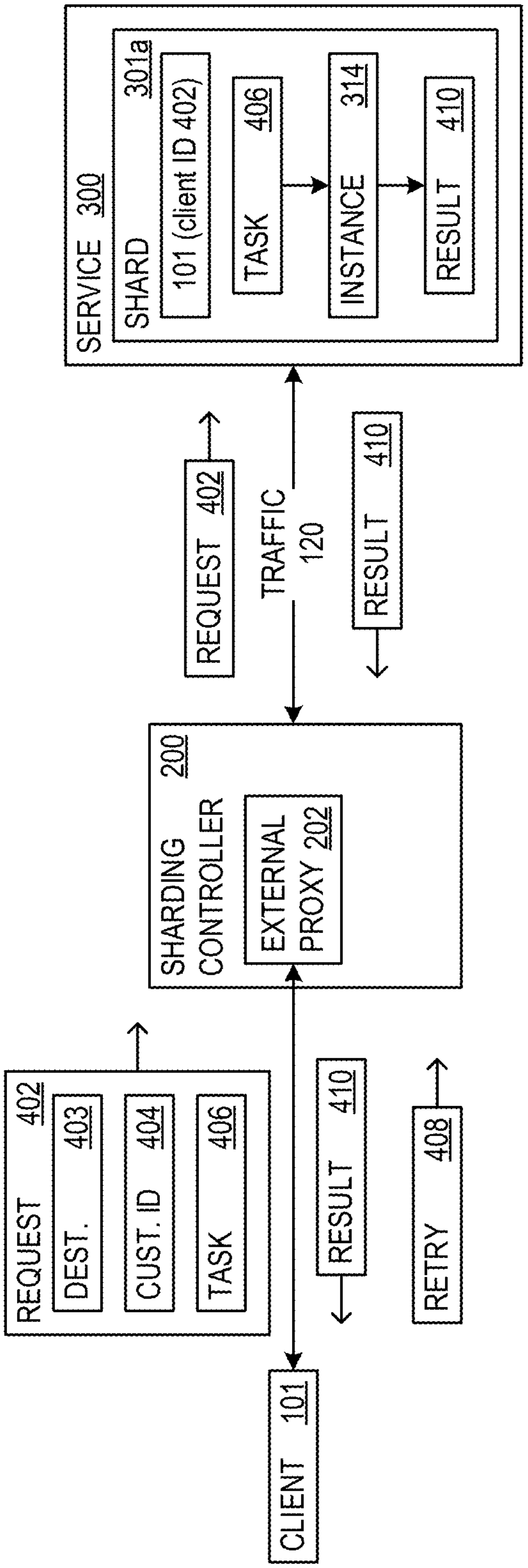
FIG. 4 illustrates exemplary messaging, as may occur in examples of the architecture of FIG. 1.

FIG. 2 illustrates further detail for sharding controller 200. Sharding controllers 200a-200c are similarly configured, except for layer proxy 204 in sharding controller 200a, as noted previously. Sharding controller 200 has an external proxy 202, a health tracker 206, a capacity tracker 208, shard manager 210, and a routing manager 214. External proxy 202 interfaces with clients, such as clients 101-108, to receive client requests and return results of processing the client requests (as shown in FIG. 4). Health tracker 206, capacity tracker 208, and shard manager 210 monitor shards and service instances and control sharding configuration within service 300 using monitoring and control signals 122. For layered sharding (without ingress sharding), health tracker 206 and capacity tracker 208, and the functionalities described for them, are not used.

Health tracker 206 monitors the health of the various service instances within service 300 (e.g., service instances 311-318 and 321-324) and records the results. Turning briefly to FIG. 3, client 107 is indicated as being not a well-behaved client. This negatively impacts shard 303a, disrupting the service instances within shard 303a, which are service instance 311, service instance 312, service instance 315, and service instance 318. If every service instance assigned to a specific shard is impacted by harmful requests from a client associated with that shard, all other clients linked to the affected shard will experience disruptions for traffic managed by that shard. This prevents client 103, client 104, and client 106 from using the service instances within shard 303a.

Service instance 311 is also in shard 302a; service instance 312 is also in shard 301a, and shard 304a; service instance 315 is also in shard 302a and shard 304a; and service instance 318 is also in shard 304a. Thus, each of shard 301a, shard 302a, shard 304a, and shard 301b is also negatively impacted by the impact to the affected service instances. Each of these other shards, shard 301a, shard 302a, shard 304a, and shard 301b, however, fortunately has at least one shard that is not impacted by client 107.

Using the results form Eq. (2), the percentage of shards impacted may be computed using Eq. (3) below formula, where x is the number of impacted workers in the shard and correlates to the capacity impact to that shard:

$$ {}^{N}C_{x} * \frac{{}^{M-N}C_{N-x}}{{}^{M}C_{N}} \quad \text{Eq. (3)} $$

For example, the percentage of shards which lose 25% of their capacity is:

$$ {}^{4}C_{1} * \frac{{}^{40-4}C_{4-1}}{{}^{40}C_{4}} = 31.25\% \quad \text{Eq. (4)} $$

Similarly the percentage of shards which lose 50% of their capacity is 4.14% and the percentage of shards which lose 75% of their capacity is 0.16%.

A shard is categorized as healthy if that shard has at least one healthy service instance, but a shard is categorized as not healthy if that shard does not have at least one healthy service instance. A service instance is categorized as healthy if that service instance meets responsiveness criteria 216 (shown in FIG. 2), but a service instance is categorized as not healthy if that service instance is not able to meet responsiveness criteria 216. In some examples, responsiveness criteria 216 may be selected in order to identify whether a service instance is able to respond to a client request within some threshold time period. The services instances in shard 303a will not meet responsiveness criteria 216 and so will not meet responsiveness criteria 216. In this instant example, service instances that do not have a presence within shard 303a do meet responsiveness criteria 216, and so are healthy.

As indicated in FIG. 3, service instance 311 is not healthy, service instance 312 is not healthy, service instance 313 is healthy, service instance 314 is healthy, service instance 315 is not healthy, service instance 316 is healthy, service instance 317 is healthy, and service instance 318 is not healthy. Shard 301a has three healthy service instances and so is healthy; shard 302a has two healthy service instances and so is healthy; shard 303a has no healthy service instances and so is not healthy; shard 304a has one healthy service instance and so is healthy, and shard 301b has four healthy service instances and so is healthy.

Client 103, client 104, and client 106 are all assigned to unhealthy shard 303a, along with noisy neighbor client 107. Within layer 131, client 104 and client 106 are also each assigned to healthy shard 302a, and so may use shard 302a. However, within layer 131, client 103 does not have any other assignment to a healthy shard. Fortunately, though, client 103 is assigned to healthy shard 301b within layer 132—notably without (noisy neighbor) client 107.

Even without the health monitoring and redirection, layered sharding offers a significant advantage over existing sharding techniques. Consider a traditional sharding strategy with 40 services instances distributed into 20 shards, each of which consists of 2 services instances. The client to shard assignments may be uniform with each shard mapped to the same number of clients (or tenants) customers or it can also be non-uniform with different shards assigned to different numbers of customers. This approach can isolate faults to a single shard, but the impact on the clients/customers within the affected shard may be significant, reaching 100% availability impact in the worst case for all clients mapped to the affected shard.

With layered sharding the same 40 services instances are distributed into four layers of ten service instances each, and in each of these layers the services instances may be distributed into shards of two services instances each, with clients (or tenants/customers) assigned in a random fashion across the shards in each layer. This results in varied shard assignments across different layers for the clients.

With layered sharding, in which the service instances differ across layers, and a customer is assigned to only a single shard per layer, the probability that a client is assigned to a failing shard is 1.0 divided by the number of shards in that layer. However, the probability that a client is assigned to a shard with the same noisy neighbor, on exactly x out of L layers, follows a binomial distribution:

$$ b(x; L, P) = {}^{L}C_{x} * P^{x} * (1-P)^{L-x} \quad \text{Eq. (5)} $$

Where b is the binomial probability, P is the probability that a client is assigned to an impacted shard (1.0 divided by the number of shards), and C is the combinations formula of the number of possible combinations of taking a sample of r elements from a set of N distinct objects.

With shuffle sharding assignment, using the result of Eq. (2) as the number of shards (91,390), the probability follows the binomial distribution:

$$b(x) = \frac{L!}{(L-x)! * x!} * \left(\frac{1}{{}^{M}C_{N}}\right)^{x} * \left(1 - \frac{1}{{}^{M}C_{N}}\right)^{L-x} \quad \text{Eq. (6)}$$

Where M is the number of service instances per layer, and N is the number of service instances per shard.

For two layers, this probability is $2.3\times10^{-8}$. For three layers, the probability drops to $1.5\times10^{-12}$. For four layers, it is $6.9\times10^{-17}$, and for 20 layers, $6.1.5\times10^{-100}$. With this layered ingress sharding scheme, it does not require many layers to reduce the likelihood, that a well-behaved client is consistently stuck with a noisy neighbor, to levels that are negligible.

The advantage of multiple layers with random tenant assignment is that it addresses the noisy neighbor problem where a noisy neighbor for a tenant in one of the layers is likely not mapped to the same shard in the other layers, as shown above. This is specifically relevant when compared to shuffle sharding (without layers), in which, even though the availability impact is limited to one shard (assuming fault tolerant clients), there is impact to capacity for the other shards. For example, in the scenario represented above, shard 303*a* is completely impacted by the harmful traffic, which is expected, however 301*a* loses 25% of its capacity since one of the four workers in that shard are impacted. Similarly, shard 302*a* loses 50% of its capacity, and shard 304*a* loses 75% of its capacity. The percentage of shards impacted can be computed by the below formula where x is the number of impacted workers in the shard and correlates to the capacity impact to the shard:

$${}^{N}C_{x} * \frac{{}^{M-N}C_{N-x}}{{}^{M}C_{N}} \quad \text{Eq. (7)}$$

For example, the percentage of shards which lose 25% of the capacity are:

$${}^{4}C_{1} * \frac{{}^{40-4}C_{4-1}}{{}^{40}C_{4}} = 31.25\% \quad \text{Eq. (8)}$$

Similarly the percentage of shards which lose 50% of the capacity are 4.14% and the percentage of shards which lose 75% of the capacity are 0.16%. In comparison, with layered sharding, the reduction in capacity due to a particular noisy neighbor will only affect one layer. The likelihood of the same noisy neighbor impacting other layers is very low, as shown above.

Returning to FIG. 2, health tracker 206 uses responsiveness criteria 216 to identify healthy service instances 220, which is shown to include service instance 313, service instance 314, service instance 316, and service instance 317, but not service instance 311, service instance 312, service instance 315, or service instance 318. For clarity, service instances 321-324 are not shown in FIG. 2, but are healthy shards, and so are within healthy service instances 220. Health tracker 206 is able to use healthy service instances 220 to identify healthy shards 222, which is shown to include shard 301*a*, shard 302*a*, shard 304*a*, and shard 301*b*, but not shard 303*a*.

In some examples, capacity tracker 208 determines the available capacity of each service instance in healthy service instances 220, and records these as service instance available capacities 230, which includes an available capacity 233 of service instance 313, an available capacity 234 of service instance 314, an available capacity 236 of service instance 316, and an available capacity 237 of service instance 317. For clarity, the available capacities of service instances 321-324 are not shown in FIG. 2, but are within service instance available capacities 230. Because the available capacity of each healthy shard is the sum of the available capacities of the healthy service instances within that shard, shard available capacities 240 (of the healthy shards) includes an available capacity 241*a* of shard 301*a*, an available capacity 242*a* of shard 302*a*, an available capacity 244*a* of shard 304*a*, and available capacity 241*b* of shard 301*b*.

Capacity awareness in sharding controller 200 enables sharding controller 200 to efficiently route client requests without overloading specific services instances even, when a shard is partially impacted. For example, service instance 316 is in both shard 301*a* and shard 304*a*. In some examples, sharding controller 200 will send less traffic (fewer client requests) to service instance 316 in shard 301*a* compared to the other healthy services instances in shard 301*a* (e.g., service instance 313 and service instance 314), in order to reserve capacity of service instance 316 to serve traffic going to shard 304*a*. Another example is a shard allocation strategy, in which clients are each assigned to multiple shards. When a client is assigned to both shard 301*a*, shard 304*a*, and shard 301*b* (as client 101 is) sharding controller 200 will send most of the traffic from client 101 to shard 301*a*, to avoid overloading service instance 316 in shard 304*a* and the two healthy service instances in shard 301*b*.

Referencing FIG. 3, briefly, because service instance 316 is the only healthy service instance in shard 304*a*, service instance 316 and shard 304*a* may have relatively low available capacities. However, because shard 301*a* has three healthy service instances (service instance 313, service instance 314, and service instance 316), and service instance 314 is only in shard 301*a* within layer 131, service instance 314 and shard 301*a* may have the highest available capacities within layer 131. Shard 302*a* has service instance 313 (which is also in shard 301*a*) and service instance 317 (which is only in shard 302*a*, within layer 131). Thus, available capacity 242*a* for shard 302*a* is likely above available capacity 244*a* for shard 304*a*, but below available capacity 241*a* for shard 301*a*. The various available capacities, however, depend heavily on the relative activity levels of the assigned clients, so there may be variations from this assessment of relative available capacities.

Using shard assignments 212, it is possible to identify a set of shards that is assigned to each client. A set of shards 250, that is assigned to client 101 is shown, which includes shard 301*a* and shard 304*a* in layer 131, and shard 301*b* in layer 132. Equivalent information is also available for other clients 102-108. The available capacities, for healthy shards, may be used for routing requests from client 101 to a selected shard, in some examples. Some examples go further, and route client requests to a particular service instance, based on service instance capacities.

Routing manager 214 uses information within shard manager 210, such as shard assignments 212, shards 250 (and equivalent information for other clients), service instance available capacities 230 (available capacity of each healthy service instance), and shard available capacities 240 (available capacity of each healthy shard) to route client requests from external proxy 202 to the selected shard or service instance within service 300, as traffic 120.

FIG. 4 shows further detail for (client) traffic 120. Client 101 sends request 402 toward service 300, which is received by external proxy 202 within sharding controller 200. Request 402 includes a destination 403, a customer identifier (ID) 404 and a task 406. Destination 403 identifies the service instance that client 101 is intending to reach, and may be, for example, an IP address of a service instance. Customer ID 404 comprises any information associating request 402 with client 101, such as a subscriber ID, an IP address, or any other suitable information. Sharding controller 200 uses customer ID 404 from request 402 to identify client 101, and then uses shard assignments 212 to identify shards 250 assigned to client 101. Shard assignments 212 may itself use customer ID 404, or there may be a translation that enables information found within request 402 to map to information within shard assignments 212, to identify shards 250.

Task 406 may be any of a network request, an HTTP request, and a local operation such as a read operation, a write operation, a key value update, and a cryptographic operation (e.g., encryption, decryption, key generation). In some examples, sharding controller 200 handles request 402 at a transport layer or an application layer, such as at Layer 4 or Layer 7 of the Open Systems Interconnection (OSI) model. The OSI model is a reference model from the International Organization for Standardization (ISO) that provides a common basis for the coordination of standards development for the purpose of systems interconnection.

In some examples, sharding controller 200 may act as a Transmission Control Protocol (TCP) proxy, parsing Layer 7 client data to identify the client and select a shard for routing traffic, thus acting as a Layer 7 proxy. In such scenarios, sharding controller 200 provides a socket transfer. Alternatively, sharding controller 200 may operate at Layer 2, parsing upper layer protocol to identify the client, and route traffic accordingly.

Service 300 receives request 402 as part of traffic 120, processes task 406 of request 402 within a service instance (e.g., service instance 314) of the selected shard (e.g., shard 301) to produce a result 410, and returns result 410 to client 101. In scenarios in which request 402 fails, and client 101 performs a retry, client 101 transmits a retry request 408 toward service 300. Retry request 408 may have the same customer ID 404 and task 406 as earlier request 402, and result 410 is then the result of processing retry request 408.

Figure 5:
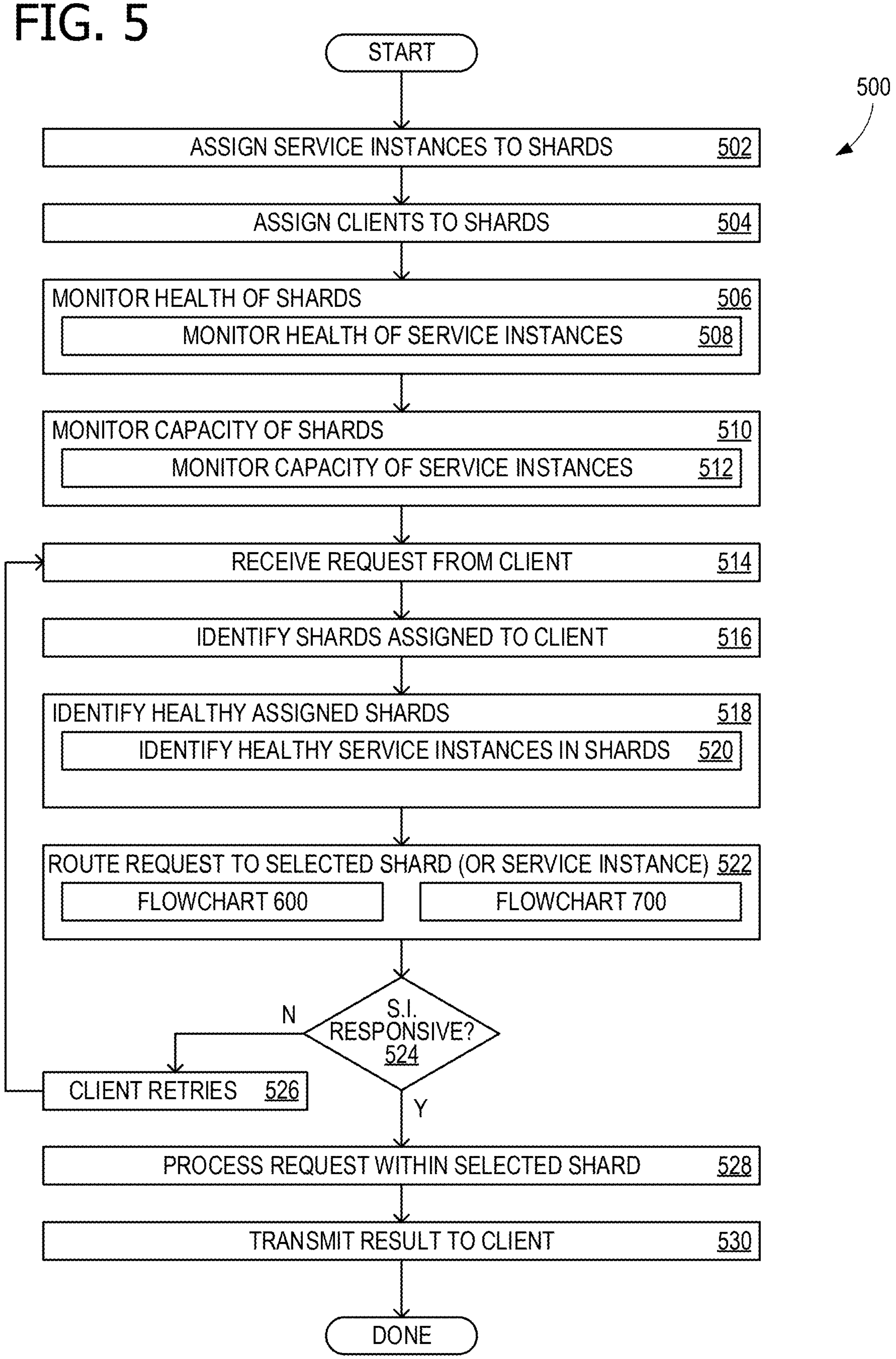
FIGS. 5, 6, 7, 8A, 8B, and 8C show flowcharts illustrating exemplary operations that may be performed when using example architectures, such as the architecture of FIG. 1.

FIG. 5 shows a flowchart 500 illustrating exemplary operations that may be performed by architecture 100. In some examples, operations described for flowchart 500 are performed by computing device 900 of FIG. 9. Flowchart 500 commences with sharding controller 200 assigning two or more service instances (e.g., four service instances), of plurality of service instances 310, to each plurality of shards within each layer of plurality of layers 130 (e.g., to each of plurality of shards 306*a*-306*c*), in operation 502. Shuffle sharding may be used in some examples. In examples, the service instance to shard assignments differ across layers.

In operation 504, sharding controller 200 assigns each client of plurality of clients 110 to two or more shards of each plurality of shards within each layer of plurality of layers 130 (e.g., to each of plurality of shards 306*a*-306*c*). Each layer has a differing assignment scheme for clients to shards. In some examples, a common sharding controller (e.g., sharding controller 200) performs operations 502 and 504 across all layers. In some examples, each layer has its own sharding controller, such as sharding controllers 200*a*-200*c* within layers 131-133, respectively, and within each layer, the layer-specific sharding controller performs the operations described for sharding controller 200. That is, sharding controller 200*a* acts as sharding controller 200 within layer 131, sharding controller 200*b* acts as sharding controller 200 within layer 132, and sharding controller 200*c* acts as sharding controller 200 within layer 133. In some examples, assigning clients (or tenants) to shards is random within each layer.

Sharding controller 200 monitors the health of each shard of plurality of shards 306*a*-306*c*, in each of layers 131-133, in operation 506, using operation 508. In operation 508, sharding controller 200 monitors the health of each service instance within the shards. Because a shard is healthy if that shard has at least one healthy service instance, and the assignments of service instances to shards is known, identifying healthy service instances also gives identification of healthy shards. Operations 506 and 508, along with operations 510, 512, 518, and 520, described below, are not used for layered sharding without ingress sharding.

Similarly, sharding controller 200 monitors the available capacity of each shard of healthy shards 222, in operation 510, using operation 512. In operation 512, sharding controller 200 monitors the available capacity of each service instance of healthy service instances 220. Because the available capacity of a shard is determined by the available capacities of the healthy service instances within that shard, and the assignments of service instances to shards is known, identifying the available capacities of the healthy service instances also gives identification of the available capacity of each healthy shard.

Request 402 is received from client 101, in operation 514, from across computer network 930. In some examples, sharding controller 200*a* within layer 131 receives request 402, even if request 402 is destined for a different layer. Based on at least receiving request 402, sharding controller 200 identifies shards 250 assigned to client 101, such as by comparing customer ID 404, found within request 402, with shard assignments 212, in operation 516. Sharding controller 200 uses shard assignments 212 to identify which of healthy shards 222 are also within shards 250 assigned to client 101, in operation 518. In the instant example, these are shard 301*a*, shard 304*a*, and shard 301*b*. In some examples, operation 518 is accomplished using operation 520, in which sharding controller 200 identifies which of healthy service instances, that are within healthy service instances 220, are assigned to client 101. In the instant example, these are service instance 313, service instance 314, and service instance 316.

In operation 522, sharding controller 200 routes request 402 to a healthy shard assigned to client 101 (e.g., shard 301*a*, shard 301*b*). In some examples (see FIG. 1A), operation 522 sends request 402 from sharding controller 200*a* to a sharding controller in another layer (e.g., sharding controller 200*b*), such as by using layer proxy 204, if the selected healthy shard is within a different layer. If so, then in examples of architecture 100*a*, the sharding controller within that same layer then further routes request 402 to the selected shard.

In examples that use operation 520, operation 522 routes request 402 to a specific healthy service instance within a selected healthy shard (e.g., service instance 314 within healthy shard 301*a* or healthy shard 301*b*). Because service instance 314 is known to be healthy, it should respond to request 402, precluding the need for retry request 408 from client 101. However, in examples that do not use operation 520, operation 522 just routes request 402 to a healthy shard (e.g., shard 301*a* or shard 301*b*). There is a chance that request 402 may go to service instance 312 within shard 301*a*, which is not healthy and so may not be responsive. This will result in the need for retry request 408, as described below in relation to operation 526.

Some examples use flowchart 600, as part of operation 522, to further use available capacity in the routing decision when there are multiple healthy shards assigned to client 101 (e.g., shard 301*a*, shard 304*a*, and shard 301*b*). Flowchart 600 is described below. Some examples that use operation 520 also use flowchart 700, as part of operation 522, to further use available capacity of service instances in the routing decision when there are multiple healthy services identified for client 101 (e.g., service instance 314 and service instance 316). Flowchart 700 is described below. For layered sharding without ingress sharding neither flowchart 600 nor flowchart 700 is used, and operation 522 merely routes request 402 to a shard assigned to client 101. For ingress sharding without layering, request 402 is not sent to another layer.

Decision operation 524 determines whether the service instance to which the instant request (request 402 or possibly retry request 408) is responsive. This may use a timer, in some examples. If the service instance is not responsive, a retry is needed, and client 101 transmits another request (e.g., retry request 408). Retry request 408 is received in operation 526, based on at least a failure of request 402. Flowchart 500 then returns to operation 514, in which retry request 408 takes the place of request 402. The count of retry requests received from client 101 will be less than a count of service instances in healthy shard 301*a*, because, since shard 301*a* is healthy, at least one service instance within shard 301*a* is healthy. So, client 101 will eventually reach a healthy service instance.

If, however, the service instance that receives the request (request 402 or retry request 408) is responsive, request 402 is processed within shard 301*a*, in operation 528. Result 410 is transmitted to client 101 in operation 530.

Figure 6:
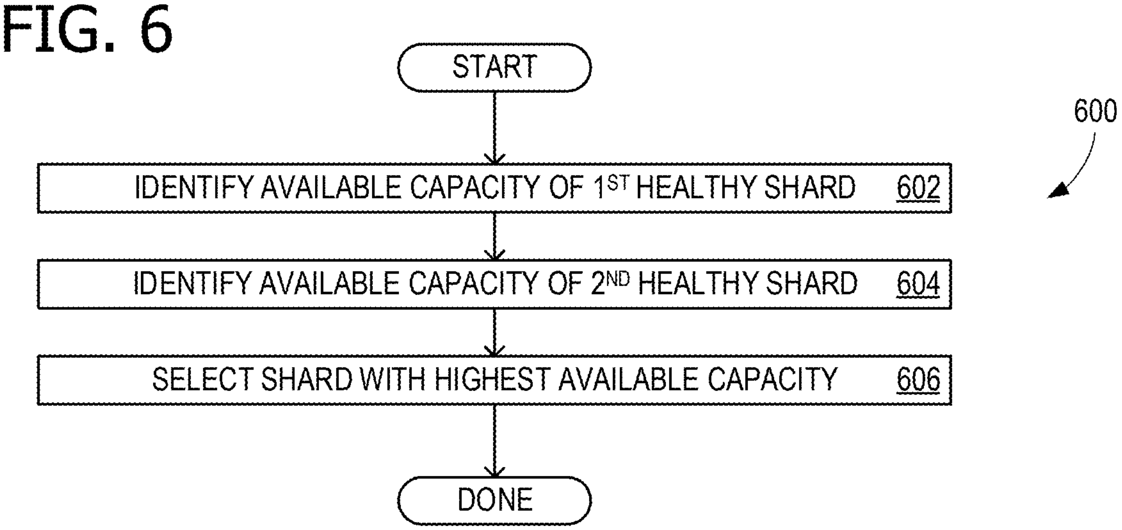

FIG. 6 shows a flowchart 600 illustrating exemplary operations that may be performed by architecture 100. In some examples, operations described for flowchart 600 are performed by computing device 900 of FIG. 9. Flowchart 600 routes request 402 to shard 301*a* based on at least determining that shard 301*a* has a higher available capacity than shard 304*a*. This is because shard 301*a* has three healthy service instances (service instance 313, service instance 314, and service instance 316), whereas shard 304*a* has only a single healthy service instance (service instance 316).

Flowchart 600 commences with sharding controller 200 identifying available capacity 241*a* of shard 301*a* in operation 602. Sharding controller 200 identifies available capacity 244*a* of shard 304*a* in operation 604. Then, in operation 606, sharding controller 200 determines that shard 301*a* has a higher available capacity than shard 304*a*, and selects shard 301*a* in favor of shard 304*a*.

Figure 7:
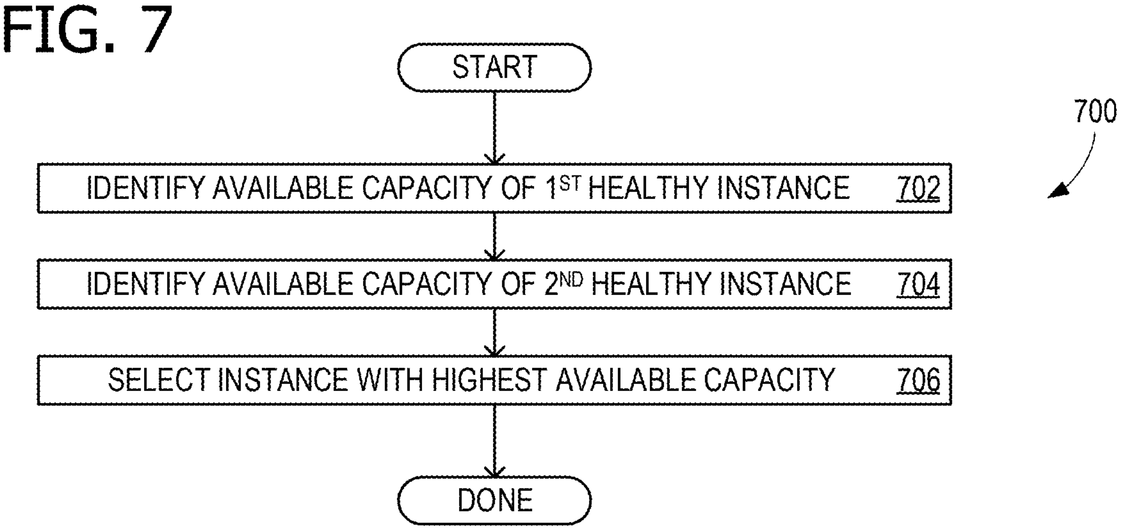

FIG. 7 shows a flowchart 700 illustrating exemplary operations that may be performed by architecture 100. In some examples, operations described for flowchart 700 are performed by computing device 900 of FIG. 9. Flowchart 700 routes request 402 to service instance 314 within shard 301*a* based on at least determining that service instance 314*a* has a higher available capacity than service instance 316 within shard 304*a*. This is because service instance 316 is the only healthy service instance within shard 304*a*, whereas shard 301*a* has three healthy service instances (service instance 313, service instance 314, and service instance 316). Therefore, service instance 314 shares the workload within shard 301*a* with two other healthy service instances, whereas service instance 316 must take all of the workload within shard 304*a*.

Flowchart 700 commences with sharding controller 200 identifying available capacity 234 of service instance 314 in operation 702. Sharding controller 200 identifies available capacity 236 of service instance 316 in operation 704. Then, in operation 706, sharding controller 200 determines that service instance 314 has a higher available capacity, and selects service instance 314 in favor of service instance 316. This has the effect of selecting shard 301*a* in favor of shard 304*a*.

Figure 8A:
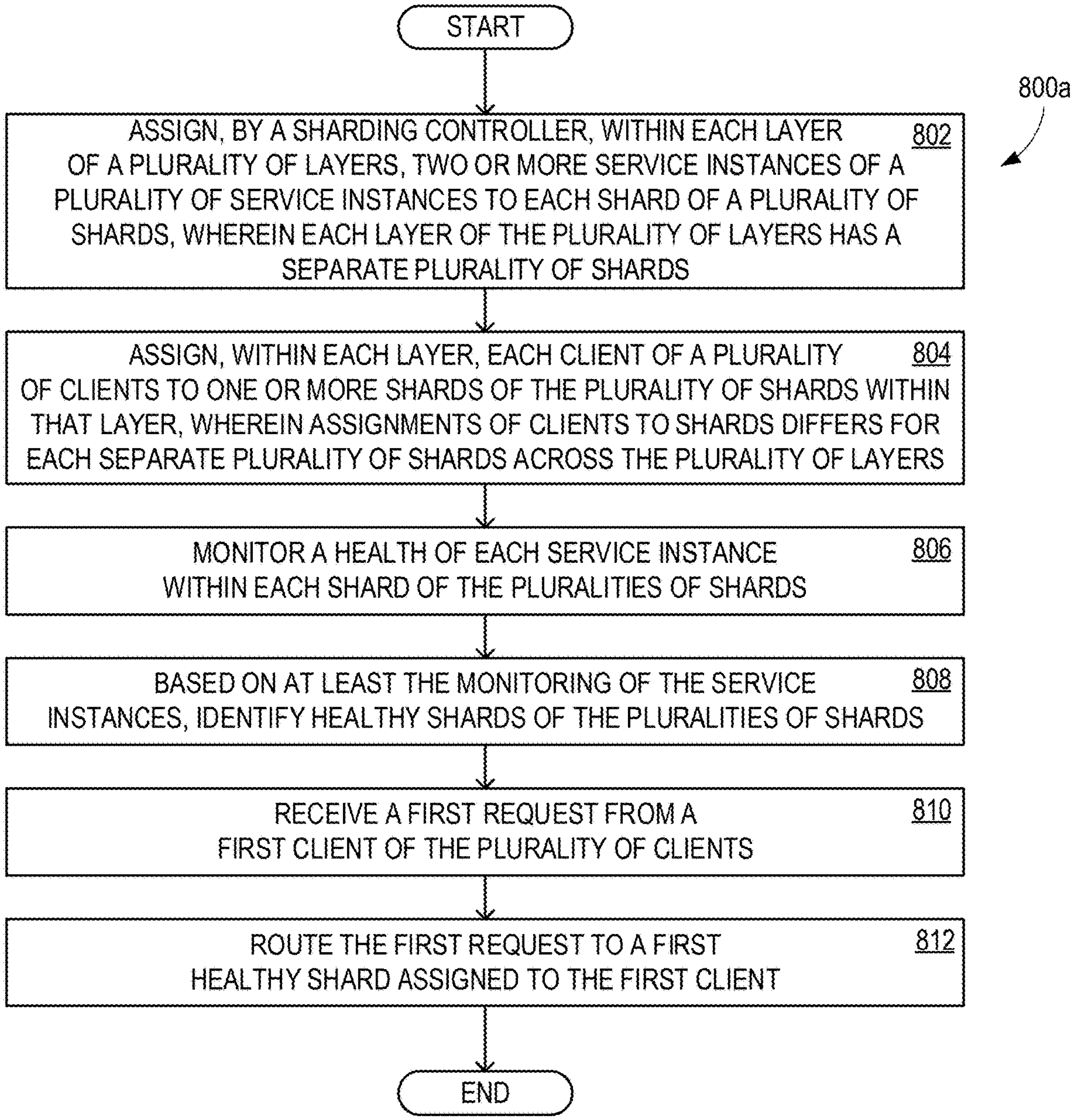

FIG. 8A shows a flowchart 800*a* illustrating exemplary operations that may be performed by architecture 100. In some examples, operations described for flowchart 800*a* are performed by computing device 900 of FIG. 9. Flowchart 800*a* commences with operation 802, which includes assigning, by a sharding controller, within each layer of a plurality of layers, two or more service instances of a plurality of service instances to each shard of a plurality of shards, wherein each layer of the plurality of layers has a separate plurality of shards.

Operation 804 includes assigning, within each layer, each client of a plurality of clients to one or more shards of the plurality of shards within that layer, wherein assignments of clients to shards differs for each separate plurality of shards across the plurality of layers. Operation 806 includes monitoring a health of each service instance within each shard of the pluralities of shards. Operation 808 includes, based on at least the monitoring of the service instances, identifying healthy shards of the pluralities of shards. Operation 810 includes receiving a first request from a first client of the plurality of clients. Operation 812 includes routing the first request to a first healthy shard assigned to the first client.

Figure 8B:
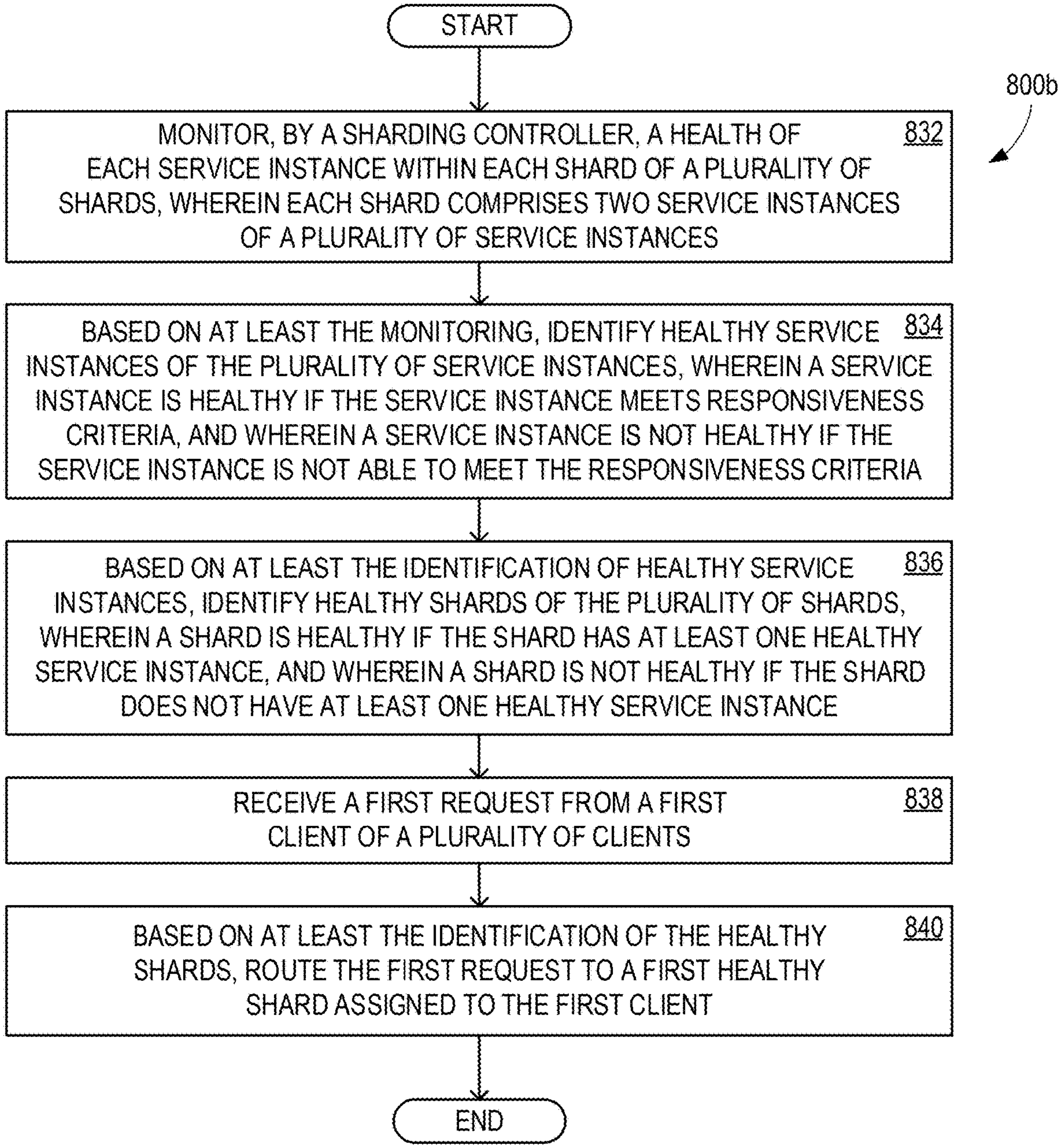

FIG. 8B shows a flowchart 800*b* illustrating exemplary operations that may be performed by architecture 100 for ingress sharding. In some examples, operations described for flowchart 800*b* are performed by computing device 900 of FIG. 9. Flowchart 800*b* commences with operation 832, which includes monitoring, by a sharding controller, a health of each service instance within each shard of a plurality of shards, wherein each shard comprises two service instances of a plurality of service instances.

Operation 834 includes, based on at least the monitoring, identifying healthy service instances of the plurality of service instances, wherein a service instance is healthy if the service instance meets responsiveness criteria, and wherein a service instance is not healthy if the service instance is not able to meet the responsiveness criteria. Operation 836 includes, based on at least the identification of healthy service instances, identifying healthy shards of the plurality of shards, wherein a shard is healthy if the shard has at least one healthy service instance, and wherein a shard is not healthy if the shard does not have at least one healthy service instance. Operation 838 includes receiving a first request from a first client of a plurality of clients. Operation 840 includes, based on at least the identification of the healthy shards, routing the first request to a first healthy shard assigned to the first client.

Figure 8C:
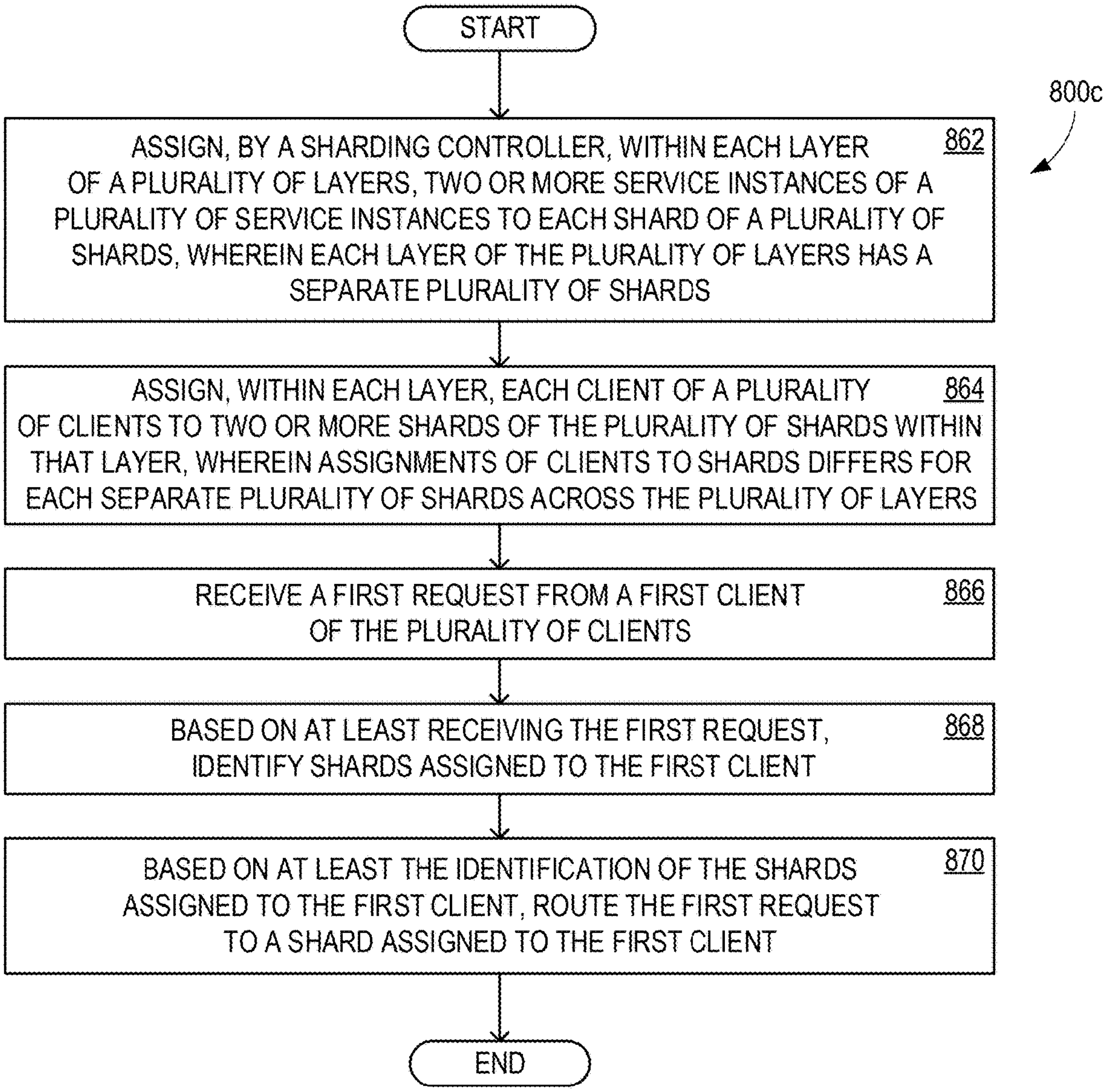

FIG. 8C shows a flowchart 800*c* illustrating exemplary operations that may be performed by architecture 100 for layered sharding. In some examples, operations described for flowchart 800*c* are performed by computing device 900 of FIG. 79. Flowchart 800*c* commences with operation 862, which includes assigning, by a sharding controller, within each layer of a plurality of layers, two or more service instances of a plurality of service instances to each shard of a plurality of shards, wherein each layer of the plurality of layers has a separate plurality of shards.

Operation 864 includes assigning, within each layer, each client of a plurality of clients to two or more shards of the plurality of shards within that layer, wherein assignments of clients to shards differs for each separate plurality of shards across the plurality of layers. Operation 866 includes receiving a first request from a first client of the plurality of clients. Operation 868 includes, based on at least receiving the first request, identifying shards assigned to the first client. Operation 870 includes, based on at least the identification of the shards assigned to the first client, routing the first request to a shard assigned to the first client.

ADDITIONAL EXAMPLES

An example system comprises: a processor; and a computer-readable medium storing instructions that are operative upon execution by the processor to: assign, by a sharding controller, within each layer of a plurality of layers, two or more service instances of a plurality of service instances to each shard of a plurality of shards, wherein each layer of the plurality of layers has a separate plurality of shards; assign, within each layer, each client of a plurality of clients to one or more shards of the plurality of shards within that layer, wherein assignments of clients to shards differs for each separate plurality of shards across the plurality of layers; monitor a health of each service instance within each shard of the pluralities of shards; based on at least the monitoring of the service instances, identify healthy shards of the pluralities of shards; receive a first request from a first client of the plurality of clients; and route the first request to a first healthy shard assigned to the first client.

Another example system comprises: a processor; and a computer-readable medium storing instructions that are operative upon execution by the processor to: monitor, by a sharding controller, a health of each service instance within each shard of a plurality of shards, wherein each shard comprises two service instances of a plurality of service instances; based on at least the monitoring, identify healthy service instances of the plurality of service instances, wherein a service instance is healthy if the service instance meets responsiveness criteria, and wherein a service instance is not healthy if the service instance is not able to meet the responsiveness criteria; based on at least the identification of healthy service instances, identify healthy shards of the plurality of shards, wherein a shard is healthy if the shard has at least one healthy service instance, and wherein a shard is not healthy if the shard does not have at least one healthy service instance; receive a first request from a first client of a plurality of clients; and based on at least the identification of the healthy shards, route the first request to a first healthy shard assigned to the first client.

Another example system comprises: a processor; and a computer-readable medium storing instructions that are operative upon execution by the processor to: assign, by a sharding controller, within each layer of a plurality of layers, two or more service instances of a plurality of service instances to each shard of a plurality of shards, wherein each layer of the plurality of layers has a separate plurality of shards; assign, within each layer, each client of a plurality of clients to two or more shards of the plurality of shards within that layer, wherein assignments of clients to shards differs for each separate plurality of shards across the plurality of layers; receive a first request from a first client of the plurality of clients; based on at least receiving the first request, identify shards assigned to the first client; and based on at least the identification of the shards assigned to the first client, route the first request to a shard assigned to the first client.

An example computer-implemented method comprises: assigning, by a sharding controller, within each layer of a plurality of layers, two or more service instances of a plurality of service instances to each shard of a plurality of shards, wherein each layer of the plurality of layers has a separate plurality of shards; assigning, within each layer, each client of a plurality of clients to one or more shards of the plurality of shards within that layer, wherein assignments of clients to shards differs for each separate plurality of shards across the plurality of layers; monitoring a health of each service instance within each shard of the pluralities of shards; based on at least the monitoring of the service instances, identifying healthy shards of the pluralities of shards; receiving a first request from a first client of the plurality of clients; and routing the first request to a first healthy shard assigned to the first client.

Another example computer-implemented method comprises: monitoring, by a sharding controller, a health of each service instance within each shard of a plurality of shards, wherein each shard comprises two service instances of a plurality of service instances; based on at least the monitoring, identifying healthy service instances of the plurality of service instances, wherein a service instance is healthy if the service instance meets responsiveness criteria, and wherein a service instance is not healthy if the service instance is not able to meet the responsiveness criteria; based on at least the identification of healthy service instances, identifying healthy shards of the plurality of shards, wherein a shard is healthy if the shard has at least one healthy service instance, and wherein a shard is not healthy if the shard does not have at least one healthy service instance; receiving a first request from a first client of a plurality of clients; and based on at least the identification of the healthy shards, routing the first request to a first healthy shard assigned to the first client.

Another example computer-implemented method comprises: assigning, by a sharding controller, within each layer of a plurality of layers, two or more service instances of a plurality of service instances to each shard of a plurality of shards, wherein each layer of the plurality of layers has a separate plurality of shards; assigning, within each layer, each client of a plurality of clients to two or more shards of the plurality of shards within that layer, wherein assignments of clients to shards differs for each separate plurality of shards across the plurality of layers; receiving a first request from a first client of the plurality of clients; based on at least receiving the first request, identifying shards assigned to the first client; and based on at least the identification of the shards assigned to the first client, routing the first request to a shard assigned to the first client.

One or more example computer storage devices has computer-executable instructions stored thereon, which, on execution by a computer, cause the computer to perform operations comprising: assigning, by a sharding controller, within each layer of a plurality of layers, two or more service instances of a plurality of service instances to each shard of a plurality of shards, wherein each layer of the plurality of layers has a separate plurality of shards; assigning, within each layer, each client of a plurality of clients to one or more shards of the plurality of shards within that layer, wherein assignments of clients to shards differs for each separate plurality of shards across the plurality of layers; monitoring a health of each service instance within each shard of the pluralities of shards; based on at least the monitoring of the service instances, identifying healthy shards of the pluralities of shards; receiving a first request from a first client of the plurality of clients; and routing the first request to a first healthy shard assigned to the first client.

One or more additional example computer storage devices has computer-executable instructions stored thereon, which, on execution by a computer, cause the computer to perform operations comprising: monitoring, by a sharding controller, a health of each service instance within each shard of a plurality of shards, wherein each shard comprises two service instances of a plurality of service instances; based on at least the monitoring, identifying healthy service instances of the plurality of service instances, wherein a service instance is healthy if the service instance meets responsiveness criteria, and wherein a service instance is not healthy if the service instance is not able to meet the responsiveness criteria; based on at least the identification of healthy service instances, identifying healthy shards of the plurality of shards, wherein a shard is healthy if the shard has at least one healthy service instance, and wherein a shard is not healthy if the shard does not have at least one healthy service instance; receiving a first request from a first client of a plurality of clients; and based on at least the identification of the healthy shards, routing the first request to a first healthy shard assigned to the first client.

One or more additional example computer storage devices has computer-executable instructions stored thereon, which, on execution by a computer, cause the computer to perform operations comprising: assigning, by a sharding controller, within each layer of a plurality of layers, two or more service instances of a plurality of service instances to each shard of a plurality of shards, wherein each layer of the plurality of layers has a separate plurality of shards; assigning, within each layer, each client of a plurality of clients to two or more shards of the plurality of shards within that layer, wherein assignments of clients to shards differs for each separate plurality of shards across the plurality of layers; receiving a first request from a first client of the plurality of clients; based on at least receiving the first request, identifying shards assigned to the first client; and based on at least the identification of the shards assigned to the first client, routing the first request to a shard assigned to the first client.

Alternatively, or in addition to the other examples described herein, examples include any combination of the following:

- processing the first request within the first healthy shard;
- transmitting, to the first client, a result of processing the first request;
- monitoring an available capacity of each healthy service instance;
- routing the first request to the first healthy shard comprises identifying a first healthy service instance in the first healthy shard;
- routing the first request to the first healthy shard comprises identifying a second healthy service instance;
- routing the first request to the first healthy shard comprises determining that the first healthy service instance has a higher available capacity than an available capacity of the second healthy service instance;
- routing the first request to the first healthy shard comprises, based on at least determining that the first healthy service instance has a higher available capacity, routing the first request to the first healthy service instance;
- monitoring an available capacity of each healthy shard;
- routing the first request to the first healthy shard comprises determining that the first healthy shard has a higher available capacity than an available capacity of a second healthy shard assigned to the first client;
- routing the first request to the first healthy shard is based on determining that the first healthy shard has a higher available capacity;
- a common sharding controller assigns and monitors the service instances within each layer;
- the common sharding controller assigns the clients to the shards within each layer;
- the common sharding controller routes the first request;
- each layer of the plurality of layers has a sharding controller that assigns and monitors the service instances within the layer;
- a first sharding controller within a first layer routes the first request to the first healthy shard if the first healthy shard is within the first layer;
- a second sharding controller within a second layer routes the first request to the first healthy shard if the first healthy shard is within the second layer;
- identifying healthy shards comprises identifying healthy service instances of the plurality of service instances;
- a service instance is healthy if the service instance meets responsiveness criteria;
- a service instance is not healthy if the service instance is not able to meet the responsiveness criteria;
- a shard is healthy if the shard has at least one healthy service instance;
- a shard is not healthy if the shard does not have at least one healthy service instance;
- assigning clients or tenants to shards is random;
- assigning four service instances to each shard;
- each shard comprises four service instances;
- assigning service instances to shards comprises performing shuffle sharding;
- assignments of service instances to shards differs for each separate plurality of shards across the plurality of layers;
- the common sharding controller monitors the service instances within each layer;
- the sharding controller within each layer assigns the clients to the shards within the layer;
- receiving the requests from across a computer network;
- identifying healthy shards assigned to the first client;
- identifying the shards assigned to the first client comprises identifying a customer ID within the first request;
- the customer ID comprises any information associating the first request with the first client;
- the responsiveness criteria comprises an ability to respond to a request within a threshold time period;
- the sharding controller handles the first request at a transport layer or an application layer;
- the sharding controller handles traffic at Layer 4 or Layer 7 of the OSI model;
- based on at least receiving the first request, identifying the shards assigned to the first client;
- routing the first request comprises sending the first request from the first sharding controller to the second sharding controller;
- the second healthy service instance is in the first healthy shard;
- the second healthy service instance is in a second healthy shard assigned to the first client;
- based on at least a failure of the first request, receiving, from the first client, a retry request; and
- a count of retry requests received from the first client is less than a count of service instances in the first healthy shard.

While the aspects of the disclosure have been described in terms of various examples with their associated operations, a person skilled in the art would appreciate that a combination of operations from any number of different examples is also within scope of the aspects of the disclosure.

Example Operating Environment

FIG. 9 is a block diagram of an example computing device 900 (e.g., a computer storage device) for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912 (i.e., a computer-readable medium), one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed within different devices.

Bus 910 represents what may be one or more buses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data **912*a* and instructions 912*b* that are executable by processor 914 and configured to carry out the various operations disclosed herein. Thus, computing device 900 comprises a computer storage device having computer-executable instructions 912*b*** stored thereon.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer storage memory," "memory," and "memory devices" are synonymous terms for the memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to computing device 900. In some examples, the processor(s) 914 are programmed to execute instructions such as those illustrated in the flow charts discussed below and depicted in the accompanying drawings. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link **926*a* to a remote resource 928 (e.g., a cloud resource) across a computer network 930. Various different examples of communication links 926 and 926*a*** include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a computer-readable medium storing instructions that are operative upon execution by the processor to:

assign, by a sharding controller, within each layer of a plurality of layers, two or more service instances of a plurality of service instances to each shard of a plurality of shards, wherein each layer of the plurality of layers has a separate plurality of shards;

assign, within each layer, each client of a plurality of clients to two or more shards of the plurality of shards within that layer, wherein assignments of clients to shards differs for each separate plurality of shards across the plurality of layers;

receive a first request from a first client of the plurality of clients;

based on at least receiving the first request, identify shards assigned to the first client; and based on at least the identification of the shards assigned to the first client, route the first request to a shard assigned to the first client.

2. The system of claim 1, wherein the instructions are further operative to:

process the first request within the shard assigned to the first client; and transmit, to the first client, a result of processing the first request.

3. The system of claim 1, wherein a common sharding controller manages the plurality of layers;

wherein the common sharding controller assigns the service instances to the shards within each layer;

wherein the common sharding controller assigns the clients to the shards within each layer;

wherein the common sharding controller communicates with the service instances within each layer; and wherein the common sharding controller routes the first request.

4. The system of claim 1, wherein each layer of the plurality of layers has a sharding controller;

wherein a first sharding controller is within a first layer;

wherein a second sharding controller is within a second layer;

wherein the first sharding controller receives the first request; and wherein routing the first request comprises sending the first request from the first sharding controller to the second sharding controller.

5. The system of claim 4, wherein assigning the service instances to the shards comprises:

assigning, by the sharding controller within each layer, the service instances to the shards within that layer.

6. The system of claim 4, wherein assigning the clients to the shards comprises:

assigning, by the sharding controller within each layer, the clients to the shards within that layer.

7. The system of claim 1, wherein the instructions are further operative to:

based on at least a failure of the first request, receive, from the first client, a retry request.

8. A computer-implemented method comprising:

assigning, by a sharding controller, within each layer of a plurality of layers, two or more service instances of a plurality of service instances to each shard of a plurality of shards, wherein each layer of the plurality of layers has a separate plurality of shards;

assigning, within each layer, each client of a plurality of clients to two or more shards of the plurality of shards within that layer, wherein assignments of clients to shards differs for each separate plurality of shards across the plurality of layers;

receiving a first request from a first client of the plurality of clients;

based on at least receiving the first request, identifying shards assigned to the first client; and based on at least the identification of the shards assigned to the first client, routing the first request to a shard assigned to the first client.

9. The computerized method of claim 8, further comprising:

processing the first request within the shard assigned to the first client; and transmitting, to the first client, a result of processing the first request.

10. The computerized method of claim 8, wherein a common sharding controller manages the plurality of layers;

wherein the common sharding controller assigns the service instances to the shards within each layer;

wherein the common sharding controller assigns the clients to the shards within each layer;

wherein the common sharding controller communicates with the service instances within each layer; and wherein the common sharding controller routes the first request.

11. The computerized method of claim 8, wherein each layer of the plurality of layers has a sharding controller;

wherein a first sharding controller is within a first layer;

wherein a second sharding controller is within a second layer;

wherein the first sharding controller receives the first request; and wherein routing the first request comprises sending the first request from the first sharding controller to the second sharding controller.

12. The computerized method of claim 11, wherein assigning the service instances to the shards comprises:

assigning, by the sharding controller within each layer, the service instances to the shards within that layer.

13. The computerized method of claim 11, wherein assigning the clients to the shards comprises:

assigning, by the sharding controller within each layer, the clients to the shards within that layer.

14. The computerized method of claim 8, wherein the sharding controller handles the first request at a transport layer or an application layer.

15. The computerized method of claim 8, further comprising:

based on at least a failure of the first request, receiving, from the first client, a retry request.

16. A computer storage device having computer-executable instructions stored thereon, which, on execution by a computer, cause the computer to perform operations comprising:

assigning, by a sharding controller, within each layer of a plurality of layers, two or more service instances of a plurality of service instances to each shard of a plurality of shards, wherein each layer of the plurality of layers has a separate plurality of shards;

assigning, within each layer, each client of a plurality of clients to two or more shards of the plurality of shards within that layer, wherein assignments of clients to shards differs for each separate plurality of shards across the plurality of layers;

receiving a first request from a first client of the plurality of clients;

based on at least receiving the first request, identifying shards assigned to the first client; and based on at least the identification of the shards assigned to the first client, routing the first request to a shard assigned to the first client.

17. The computer storage device of claim 16, wherein the operations further comprise:

processing the first request within the shard assigned to the first client; and transmitting, to the first client, a result of processing the first request.

18. The computer storage device of claim 16, wherein a common sharding controller manages the plurality of layers;

wherein the common sharding controller assigns the service instances to the shards within each layer;

wherein the common sharding controller assigns the clients to the shards within each layer;

wherein the common sharding controller communicates with the service instances within each layer; and wherein the common sharding controller routes the first request.

19. The computer storage device of claim 16, wherein each layer of the plurality of layers has a sharding controller;

wherein a first sharding controller is within a first layer;

wherein a second sharding controller is within a second layer;

wherein the first sharding controller receives the first request; and wherein routing the first request comprises sending the first request from the first sharding controller to the second sharding controller.

20. The computer storage device of claim 19, wherein assigning the service instances to the shards comprises:

assigning, by the sharding controller within each layer, the service instances to the shards within that layer; and wherein assigning the clients to the shards comprises:

assigning, by the sharding controller within each layer, the clients to the shards within that layer.

* * * * *